United States Patent
Schwalbach et al.

(10) Patent No.: US 9,755,355 B2
(45) Date of Patent: Sep. 5, 2017

(54) CONNECTION MODULE FOR A PORTABLE ELECTRONIC DEVICE

(71) Applicant: Apple Inc., Cupertino, CA (US)

(72) Inventors: Charles A. Schwalbach, Menlo Park, CA (US); Liane Fang, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/088,986

(22) Filed: Apr. 1, 2016

(65) Prior Publication Data

US 2016/0301157 A1  Oct. 13, 2016

Related U.S. Application Data

(60) Provisional application No. 62/145,425, filed on Apr. 9, 2015.

(51) Int. Cl.
*H01R 13/62* (2006.01)
*H04B 1/3827* (2015.01)

(52) U.S. Cl.
CPC ....... *H01R 13/6205* (2013.01); *H04B 1/3833* (2013.01)

(58) Field of Classification Search
CPC .... H01R 13/6205; H01R 13/62; H01R 13/26; H01R 13/4534; H01R 13/4538; H01R 13/02; H01R 24/62; H01R 13/502; H01R 12/716; H01R 43/0256; H01R 43/20
USPC ......... 439/38, 131, 135, 136, 139, 140, 141, 439/374, 378
See application file for complete search history.

(56) References Cited

U.S. PATENT DOCUMENTS

| | | | | |
|---|---|---|---|---|
| 6,231,358 B1 * | 5/2001 | Kerr, Jr. | ................. | H01R 24/66 439/140 |
| 7,121,850 B2 * | 10/2006 | Yeh | ........................ | H01R 24/62 439/131 |
| 7,416,419 B2 * | 8/2008 | Collantes, Jr. | ....... | H05K 9/0067 439/76.1 |
| 7,556,514 B1 * | 7/2009 | Sorensson | ............ | H01R 31/065 439/140 |
| 8,029,303 B2 * | 10/2011 | Chiang | .................. | H01R 13/60 439/131 |
| 8,888,500 B2 * | 11/2014 | Gao | ........................ | H01R 13/17 439/39 |
| 2002/0123256 A1 * | 9/2002 | Brickett | ............... | H01R 13/533 439/140 |
| 2004/0077187 A1 * | 4/2004 | Belongia | ............ | H01R 13/6205 439/39 |

(Continued)

*Primary Examiner* — Harshad Patel
(74) *Attorney, Agent, or Firm* — Kilpatrick Townsend and Stockton, LLP

(57) ABSTRACT

A connection module for a portable electronic device is disclosed. The connection module includes a mating structure that is configured to attach to a mating structure interface of the portable electronic device. The mating structure includes a fixed alignment projection disposed on a first end of the mating structure, a retractable alignment projection disposed on a second end of the mating structure, and a retractable electrical connector disposed between the fixed alignment projection and the retractable alignment projection. The retractable electrical connector and the retractable alignment projection are fixed relative to each other and movable relative to the fixed alignment projection.

20 Claims, 10 Drawing Sheets

(56) References Cited

U.S. PATENT DOCUMENTS

2008/0280490 A1* 11/2008 Nguyen .............. G06F 12/1416
439/607.01

* cited by examiner

CONNECTION MODULE FOR A PORTABLE ELECTRONIC DEVICE

CROSS-REFERENCE TO RELATED APPLICATION(S)

This application claims priority to U.S. Provisional Application No. 62/145,425, filed on Apr. 9, 2015, which is incorporated herein in its entirety by reference thereto.

FIELD

The described embodiments relate generally to connection modules.

BACKGROUND

Connection modules may attach to portable electronic devices.

SUMMARY

The present disclosure details systems, apparatuses, and methods related to connection modules for portable electronic devices. A connection module for a portable electronic device may include an external housing. The external housing may have a mating structure configured to attach to a mating structure interface of a portable electronic device. A first alignment projection may be disposed on a first end of the mating structure.

In some embodiments, the connection module may also include an internal housing disposed within the external housing and containing circuitry. The internal housing may be configured to shift between a retracted position and an inserted or extended position. One end of the internal housing may include a plug that includes spring pins coupled to the circuitry and a second alignment projection.

In some embodiments, the first and second alignment projections may be disposed on opposite ends of the portable electronic device when the connection module is attached to the portable electronic device with the internal housing in an inserted or extended position.

In some embodiments, the connection module includes a mating structure configured to attach to a mating structure interface of the portable electronic device. In some embodiments, the mating structure includes a fixed alignment projection disposed on a first end of the mating structure, a retractable alignment projection disposed on a second end of the mating structure, and a retractable electrical connector disposed between the fixed alignment projection and the retractable alignment projection. In some embodiments, the retractable electrical connector and the retractable alignment projection are fixed relative to each other and movable relative to the fixed alignment projection.

In some embodiments, the retractable electrical connector includes spring pins. In some embodiments, the fixed and retractable alignment projections are disposed on opposite ends of the portable electronic device when the connection module is attached to the portable electronic device, thereby preventing movement of the portable electronic device relative to the retractable electrical connector.

In some embodiments, the mating structure includes a partially cylindrical structure disposed between the fixed alignment projection and the retractable alignment projection. In some embodiments, when the connection module is attached to the portable electronic device, the partially cylindrical structure is disposed within a cylindrical groove of the portable electronic device to prevent movement of the portable electronic device relative to the connection module in at least two dimensions, and the first and second alignment projections are disposed on opposite ends of the cylindrical groove to prevent movement of the portable electronic device relative to the connection module in a third dimension different from the at least two dimensions.

In some embodiments, the mating structure includes two partially cylindrical structures disposed between the fixed alignment projection and the retractable alignment projection and separated from each other by a gap. In some embodiments, the retractable electrical connector extends through the gap between the two partially cylindrical structures when the retractable electrical connector is in an extended position.

In some embodiments, the connection module includes an external housing. In some embodiments, the mating structure is disposed on a front surface of the external housing. In some embodiments, the front surface includes at least two apertures through which the retractable alignment projection and the retractable electrical connector may move. In some embodiments, the connection module includes an aperture disposed in the external housing and a button slidable with respect to the external housing and accessible through the aperture. In some embodiments, the button is configured to slide within the aperture to move the retractable alignment projection and the retractable electrical connector between a retracted position and an extended position.

In some embodiments, the connection module includes a first retraction magnet fixed relative to the external housing and a second retraction magnet fixed relative to the retractable alignment projection and the retractable electrical connector. In some embodiments, the first and second retraction magnets are configured to hold the retractable alignment projection and the retractable electrical connector in a retracted position or an extended position.

In some embodiments, a method of connecting a connection module to a portable electronic device includes sliding a mating structure of the connection module into a mating structure interface of the portable electronic device until a first alignment projection of the mating structure abuts the portable electronic device, electrically connecting an electrical connector of the connection module to contact pads of the portable electronic device by moving the electrical connector from a retracted position to an extended position, and locking the portable electronic device in position relative to the connection module by a second alignment projection that abuts the portable electronic device opposite the first alignment projection.

In some embodiments, the second alignment projection locks the portable electronic device in position by moving from the retracted position to the extended position after the mating structure of the connection module is slid into the mating structure interface of the portable electronic device. In some embodiments, the method includes moving the electrical connector to the retracted position and sliding the mating structure out of the mating structure interface.

In some embodiments, moving the electrical connector from the retracted position to the inserted position includes sliding a button fixed relative to the electrical connector along a track disposed in an external housing of the connection module. In some embodiments, moving the electrical connector from the retracted position to the inserted position moves spring pins of the electrical connector and the second alignment projection from within an external housing of the connection module to extend out of the external housing of the connection module.

In some embodiments, a direction of sliding the mating structure into the mating structure interface is perpendicular to a direction of a transition between the retracted position and the extended position.

In some embodiments, the method includes obtaining diagnostic information from components of the portable electronic device through the electrical connector. In some embodiments, the method includes writing data to components of the portable electronic device through the electrical connector.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
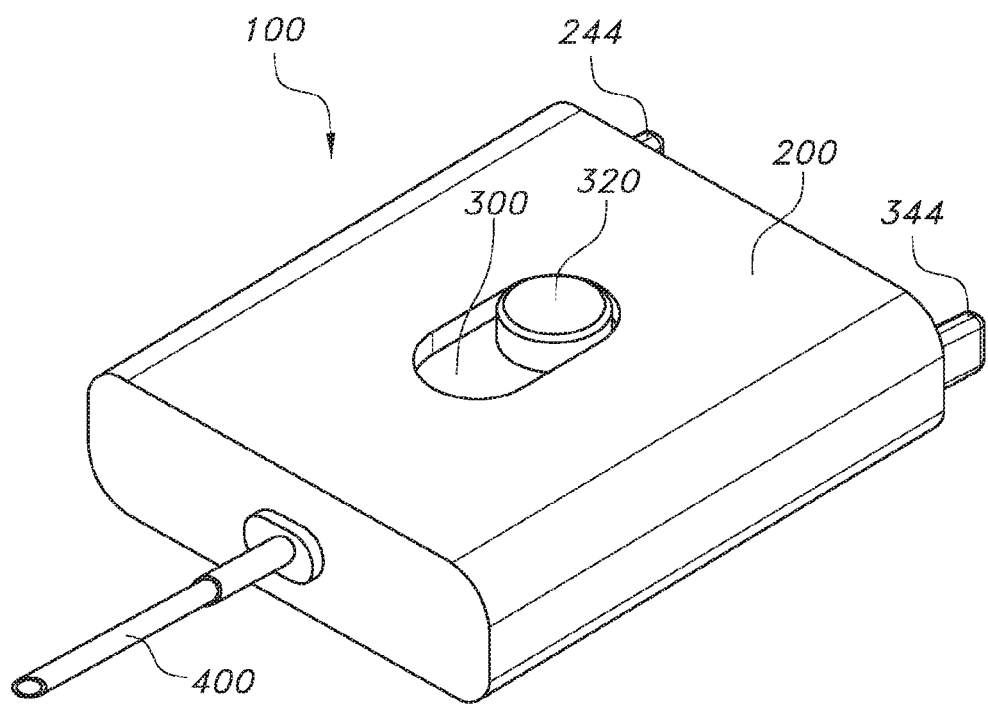
FIG. 1 is a rear isometric view of a connection module according to some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Advances in portable computing have led to a wide variety of different portable electronic devices. Portable electronic devices may have wireless communication capabilities. However, some communication is achieved through an electrical connection. Such communication may include any kind of data transfer, including obtaining diagnostic information from the portable electronic device or instructing the portable electronic device to perform various actions, such as diagnostic tests.

The following disclosure relates to a connection module for portable electronic devices, and a connection mechanism for electrically connecting to an electronic device. Connection modules according to embodiments of the present invention may be used for any kind of portable electronic devices. For example, connection modules may be configured for, but not limited to, use with a smart watch. Such connection modules may enable a variety of different interactions with the portable electronic device, such as obtaining data from the portable electronic device, transferring data to the portable electronic device, obtaining diagnostic information from the portable electronic device, instructing the portable electronic device to perform various actions such as running diagnostic tests, and so on.

In some embodiments, a connection module includes an external housing and an internal housing. The internal housing is configured to slide between two positions within external housing: a retracted position and an inserted or extended position. One end of the external housing includes a mating structure that is configured to attach to a mating structure interface on a portable electronic device (e.g., to removably connect or temporarily affix the connection module to the electronic device). The end of the internal housing that aligns with this end of the external housing may include a plug with spring pins configured to correspond to contact pads within the mating structure interface on the portable electronic device.

To protect the spring pins, the mating structure interface, and/or other portions of the portable electronic device, the internal housing is maintained in a retracted position until spring pins have been properly aligned with the contact pads. The external housing and the internal housing each provide an alignment projection that is configured to abut opposing edges of the portable electronic device when the connection module is in the inserted position to ensure alignment has been achieved and will be maintained while the connection module is in use.

These and other embodiments are discussed below with reference to the figures. However, those skilled in the art will readily appreciate that the detailed description given herein with respect to these figures is for explanatory purposes only and should not be construed as limiting.

Figure 2:
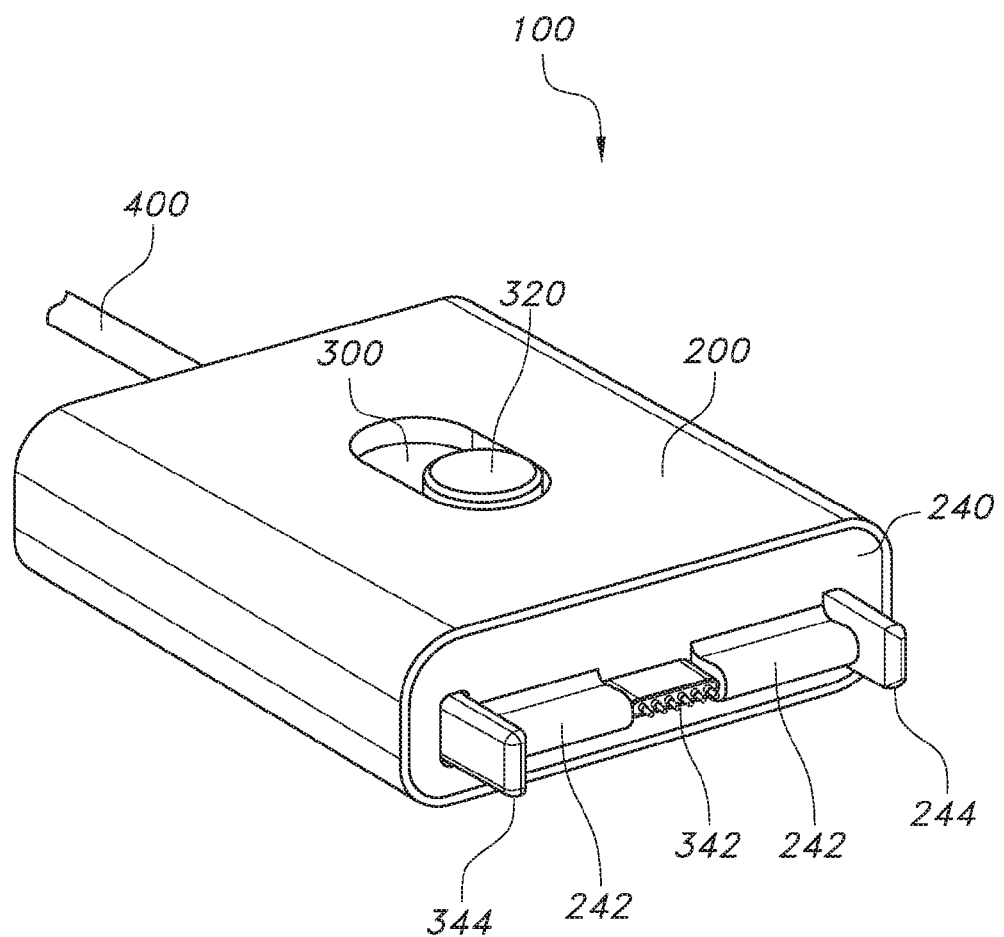
FIG. 2 is a front isometric view of a connection module according to some embodiments.
Figure 3:
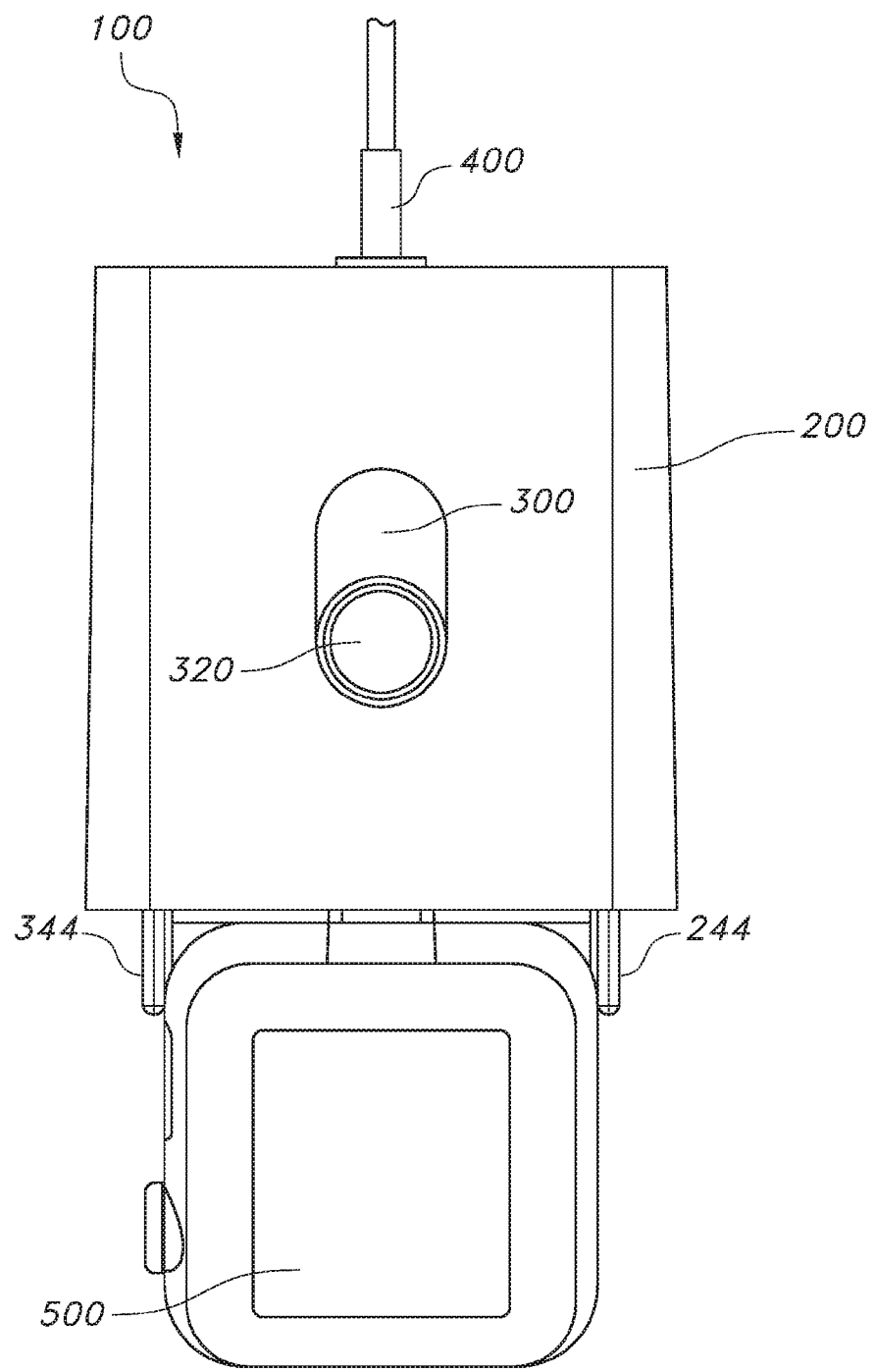
FIG. 3 shows a connection module according to some embodiments attached to a portable electronic device.

FIGS. 1 and 2 are isometric views showing a connection module TOO having an external housing or slider case 200 and an internal housing or pusher case 300. Connection module 100 is configured to interact with a portable electronic device 500 for various purposes, as shown in FIG. 3. In some embodiments, connection module 100 comprises a diagnostic device. For example, connection module 100 may, among other things, obtain diagnostic information from components of portable electronic device 500, reset portable electronic device 500 to an initial configuration, obtain data stored by components or portable electronic device 500, or write data to components of portable electronic device 500.

Connection module 100, according to some embodiments, accomplishes these interactions by establishing an electrical connection by directly attaching to portable electronic device 500. As illustrated in FIG. 2, connection module 100 may include a mating structure, which may include an attachment projection 242 configured to mate with a mating structure interface 510 (FIG. 7) of portable electronic device 500 and a retractable electrical connector 342 (e.g., spring pins 342, also known as pogo pins) or other conductors configured to connect with contact pads 520 (FIG. 7) of portable electronic device 500. In addition, as part of the mating structure, connection module 100 may provide alignment projections 244 (i.e., a fixed alignment projection) and 344 (i.e., a retractable alignment projection) configured to establish and maintain proper alignment of spring pins 342 with contact pads of portable electronic device 500.

Figure 4:
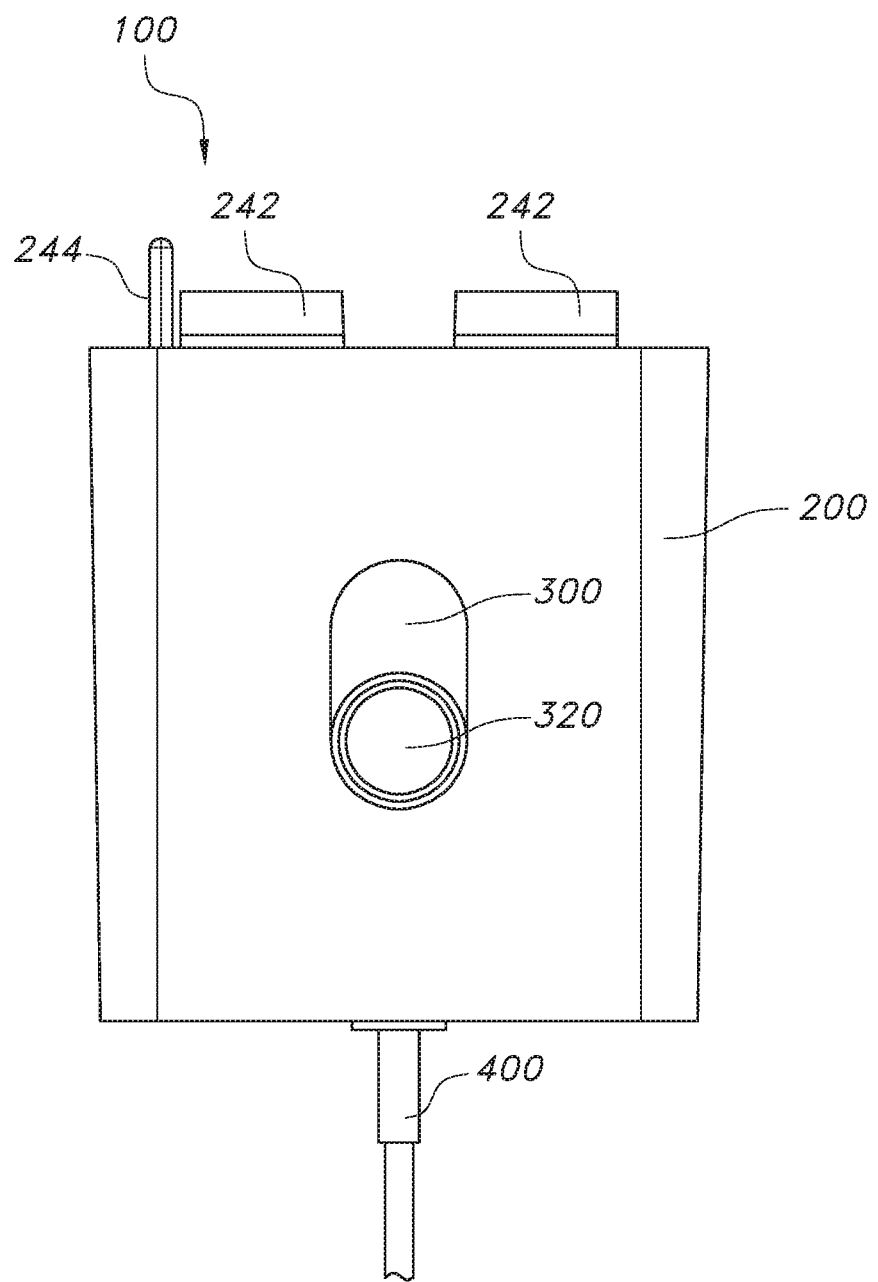
FIG. 4 shows a connection module in a retracted position according to some embodiments.
Figure 5:
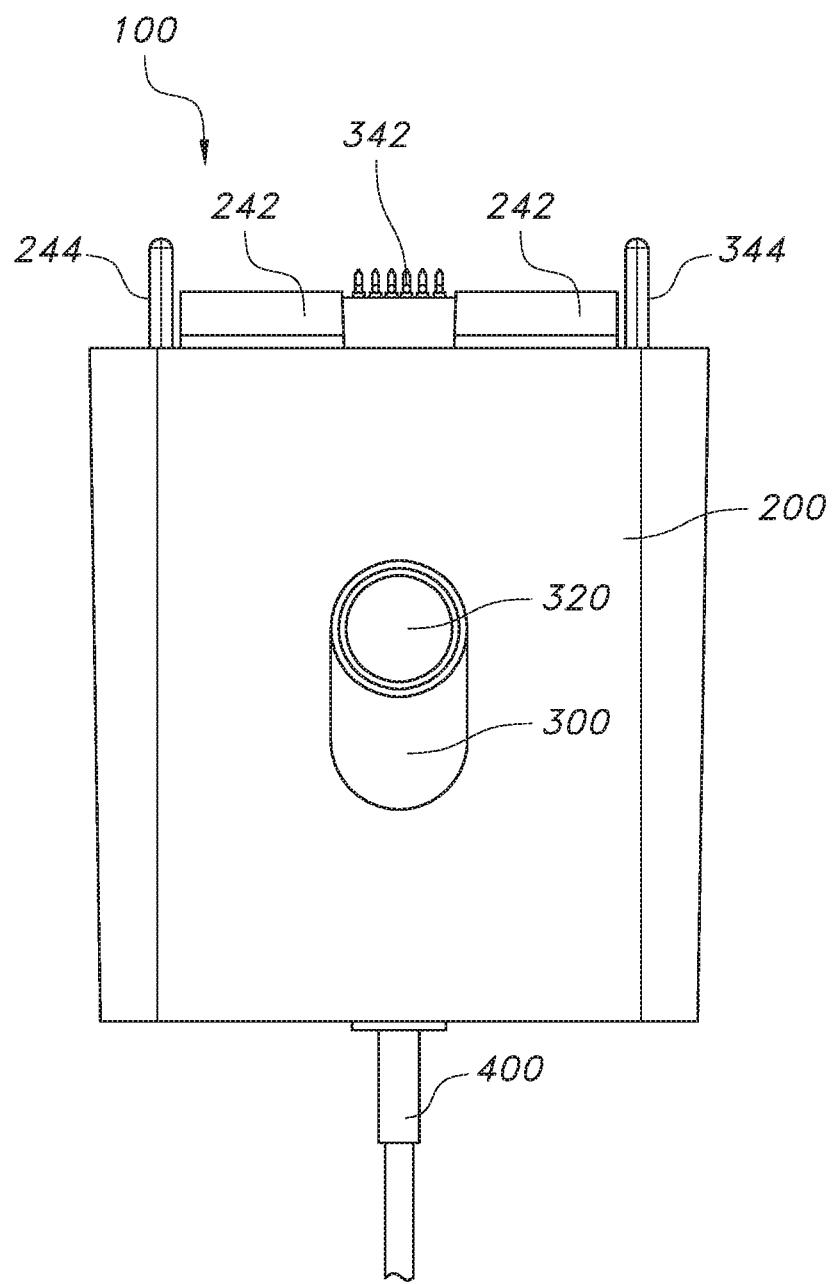
FIG. 5 shows a connection module in an inserted position according to some embodiments.

In some embodiments, connection module 100 provides for two positions. Connection module 100 provides for a retracted position, as illustrated in FIG. 4. In the retracted position, only alignment projection 244 and attachment projection 242 protrude from connection module 100. Connection module 100 further provides for an inserted or extended position, as illustrated in FIG. 5. In the inserted position, alignment projections 244 and 344, attachment projection 242, and spring pins 342 all protrude from connection module 100. Connection module 100 establishes an electrical connection with portable electronic device 500 only in the inserted position. Moreover, in the inserted position, alignment projections 244 and 344 prevent or inhibit removal or misalignment of connection module 100.

Connection module 100 may connect to an external data or power source (e.g., a computer or other device) via connector 400. In some embodiments, connector 400 connects to connection module 100 by extending through slider case 200 and connecting with pusher case 300. Connector 400 may be utilized both when connection module 100 is attached to portable electronic device 500 and when it is unattached. Moreover connector 400 may be utilized to provide power, instructions, or other data to connection module 100. In some embodiments, data provided through connector 400 is written onto memory within connection module 100 and stored for future transmittal of the data to portable electronic device 500. In other embodiments, data provided through connector 400 simply passes through connection module 100 directly to portable electronic device 500.

According to some embodiments, connection module 100 is an assembly of various components within slider case 200 and pusher case 300. Slider case 200 provides an outer casing for connection module 100.

Figure 6:
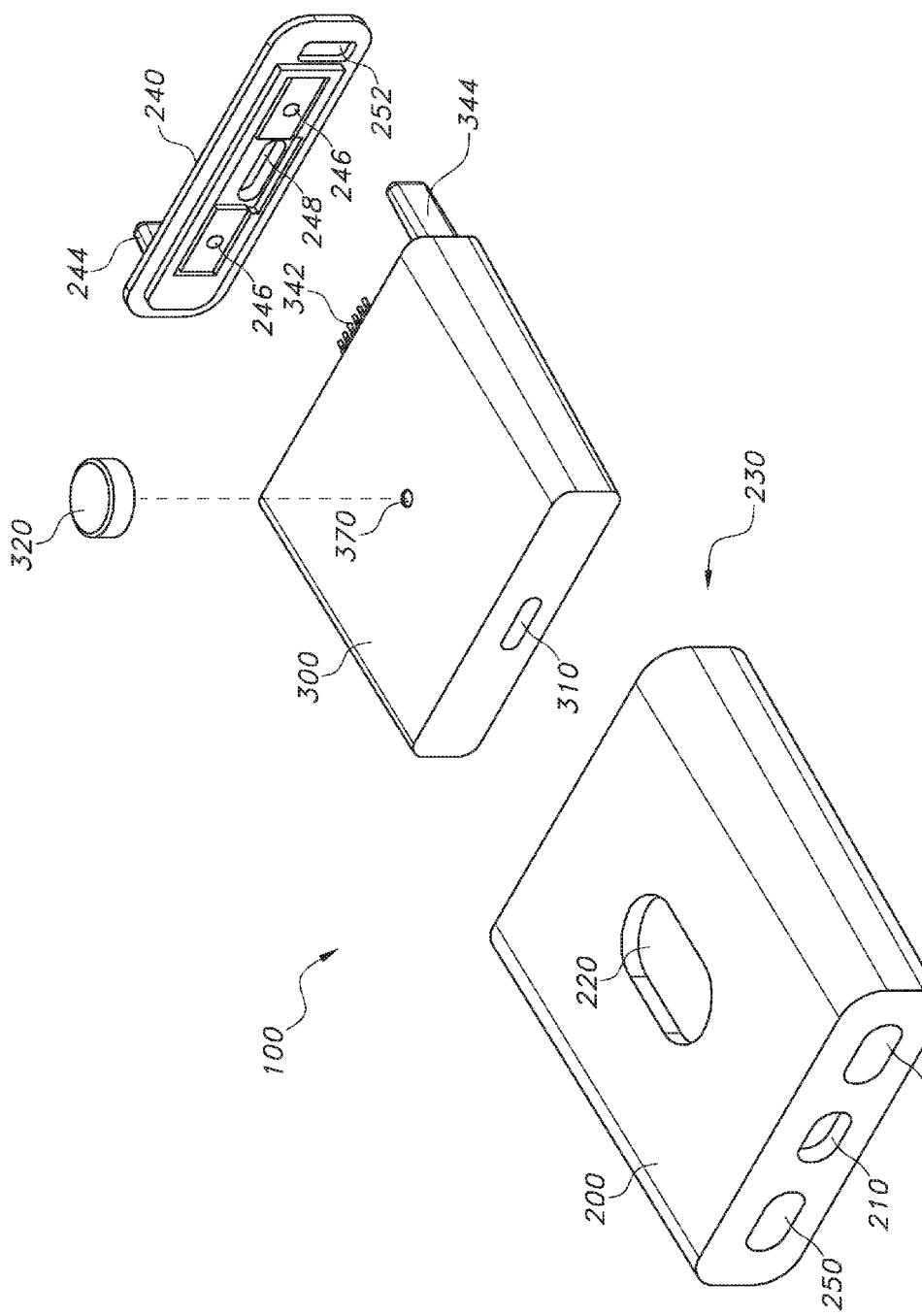
FIG. 6 shows an exploded view of a connection module according to some embodiments.

Slider case 200 may include multiple apertures. For example, as shown in FIG. 6, slider case 200 may include a connector aperture 210, a button aperture 220, and a pusher case aperture 230.

In some embodiments, connector aperture 210 is disposed on a back surface of slider case 200 and is configured to receive connector 400. Thus, connector aperture 210 provides connector 400 access to pusher case 300. Accordingly, connector aperture 210 may be any size and shape suitable for receiving connector 400. In some embodiments, connector 400 is an Apple Lightning® connector (by Apple Inc.®) and connector aperture 210 is sized to receive an Apple Lightning® connector. Other embodiments of connection module 100 may provide connector aperture 210 in alternative locations on slider case 200.

Button aperture 220 is configured to receive a button 320 that attaches to pusher case 300 and functions as a switch to toggle connection module 100 between its retracted position and its inserted position. According to some embodiments, button aperture 220 is provided on a top surface of slider case 200. Other embodiments provide button aperture 220 on a side or bottom surface of slider case 200. In some embodiments, button aperture 220 is shaped to provide a track for button 320 to slide between the retracted and inserted positions. In some embodiments, button aperture 220 may be oval-shaped. In other embodiments, button aperture 220 may be rectangular.

Pusher case aperture 230 is provided on a front end of slider case 200. Pusher case aperture 230 is configured to receive pusher case 300 during assembly. After pusher case 300 is within slider case 200, slider cap 240 covers pusher case aperture 230 and becomes the front surface of slider case 200.

Figure 7:
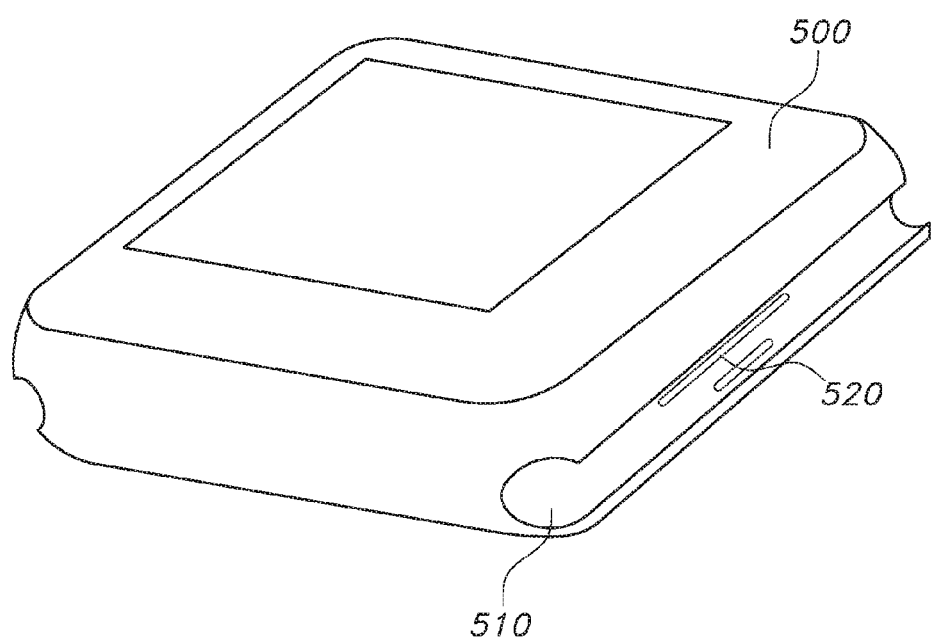
FIG. 7 shows a portable electronic device configured to receive a connection module according to some embodiments.

According to some embodiments, slider cap 240 comprises an attachment projection 242, an alignment projection 244, a spring pin aperture 248, and an alignment projection aperture 252. Slider cap 240 constitutes the front surface of connection module 100 and is configured to mate with portable electronic device 500 via attachment projection 242 (FIG. 2). In some embodiments, attachment projection 242 is provided on an outer surface of slider cap 240. Attachment projection 242 may be partially cylindrical and configured to slide into mating structure interface 510, such as a cylindrical groove, on portable electronic device 500 (FIG. 7).

In some embodiments, attachment projection 242 comprises two partially cylindrical structures with a spring pin aperture 248 between them. Spring pin aperture 248 is configured to allow spring pins 342 to extend between the two portions of attachment projection 242.

An alignment projection 244 may be provided on one end of attachment projection 242. Alignment projection 244 may extend beyond attachment projection 242 such that it does not fit with mating structure interface 510, such as a cylindrical groove, on portable electronic device 500. In some embodiments, alignment projection 244 may be a different shape or size than mating structure interface 510 on portable electronic device 500. In some embodiments, alignment projection 244 is disposed directly adjacent to attachment projection 242. Regardless of its size or shape, alignment projection 244 is configured to abut an edge of portable electronic device 500 so that spring pin aperture 248 is aligned with contact pads 520 on portable electronic device 500.

In some embodiments, alignment projection aperture 252 is disposed on an opposite end of attachment projection 242. Alignment projection aperture 252 is configured to receive an alignment projection 344, as described below.

Figure 8:
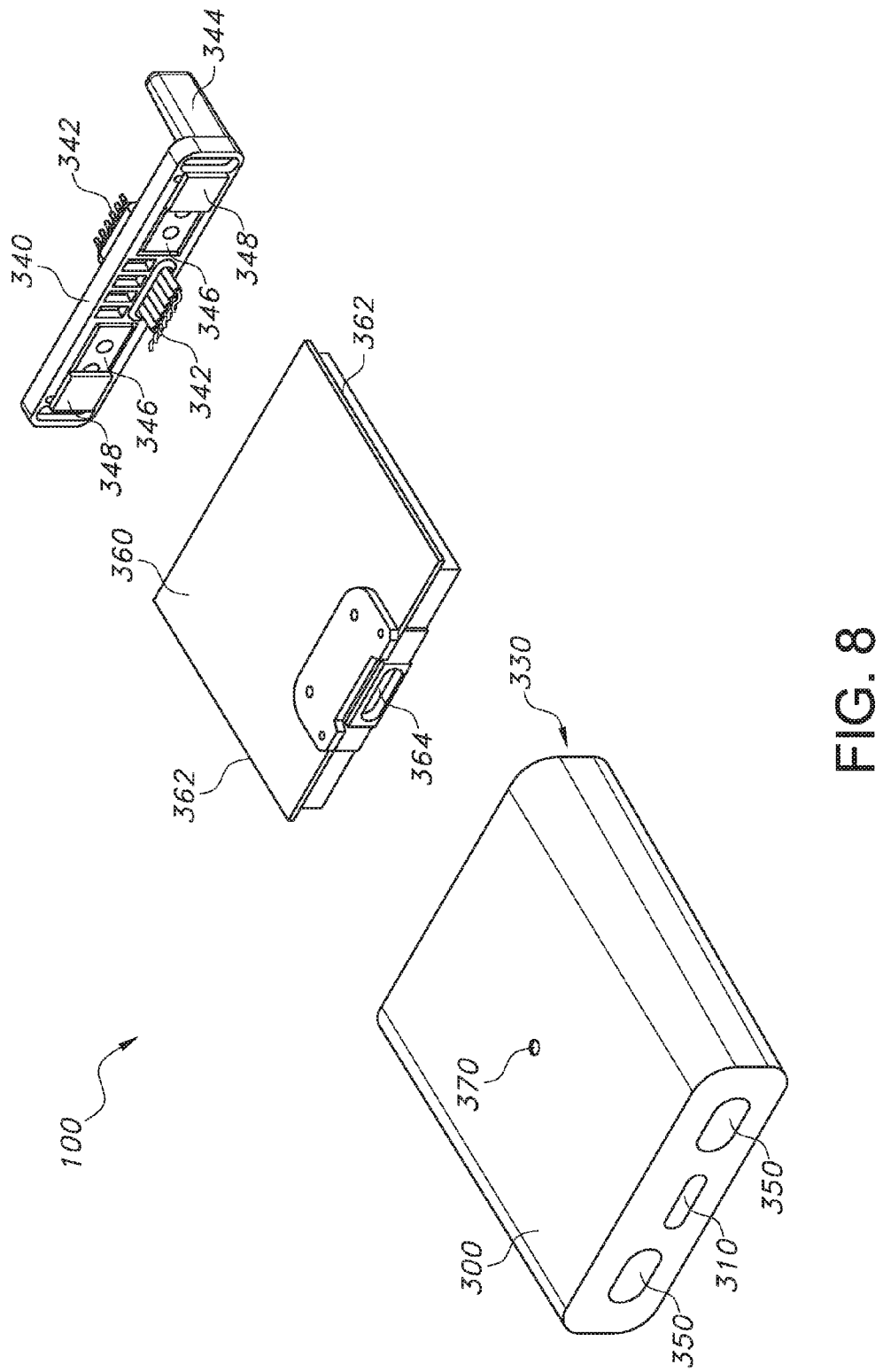
FIG. 8 shows an exploded view of a pusher sub assembly of a connection module according to some embodiments.
Figure 9:
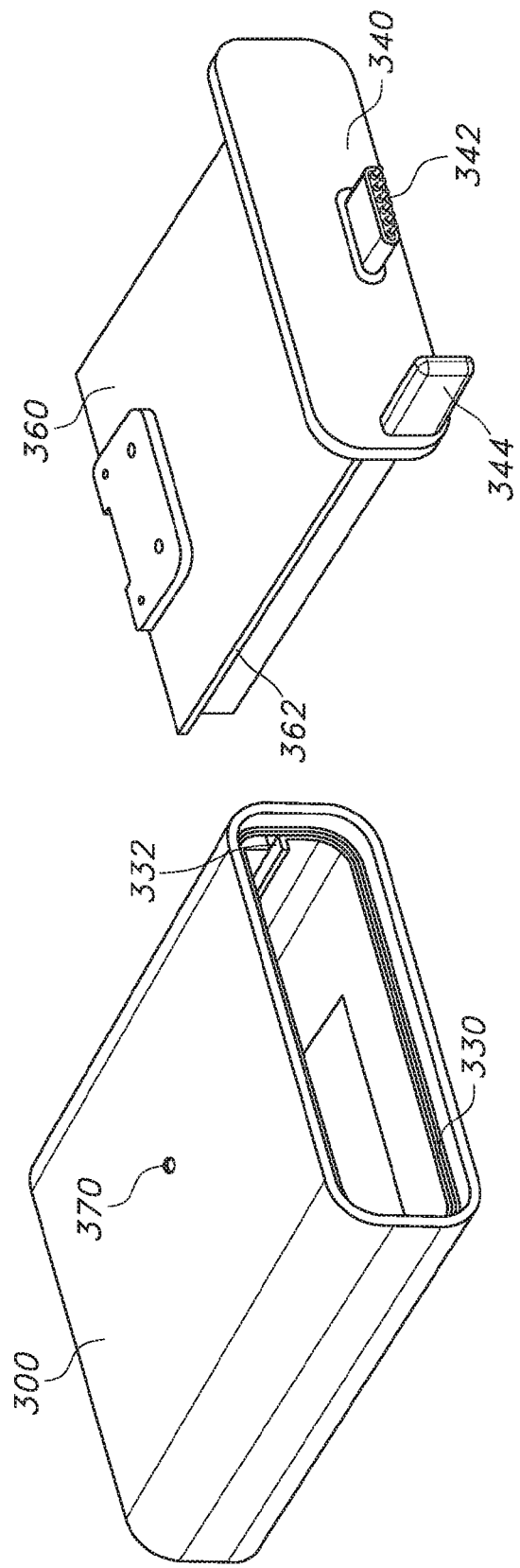
FIG. 9 shows an exploded view of a connection module according to some embodiments.

According to some embodiments, pusher case 300 is disposed within slider case 200. Pusher case 300 is smaller than slider case 200 such that pusher case 300 can slide between the retracted position and the inserted position within slider case 200. With reference to FIGS. 8 and 9, in some embodiments, pusher case 300 includes a connector aperture 310. Connector aperture 310 is preferably aligned with connector aperture 210 in slider case 200 and is configured to receive connector 400. In some embodiments, connector aperture 310 is configured to receive an Apple Lightning® connector.

Pusher case 300 is configured to receive button 320. For example, button 320 may attach to a top surface of pusher case 300 and may extend through button aperture 220 of slider case 200. Alternatively, pusher case 300 may receive button 320 on a bottom or side surface. In some embodiments, pusher case 300 includes a small hole 370 through which a small protrusion 322 (FIG. 10) on the bottom of button 320 may be inserted. Button 320 is further glued to pusher case 300 to maintain attachment. Button 320 functions as a switch to toggle between the retracted and inserted positions.

Pusher case 300 may also include circuit board aperture 330. Circuit board aperture 330 is provided on a front end of pusher case 300. Circuit board aperture 330 is configured to receive circuit board 360 during assembly. After circuit board 360 is within pusher case 300, pusher cap 340 covers circuit board aperture 330 and becomes the front surface of the pusher case assembly.

In some embodiments, the outer surface of pusher cap 340 includes spring pins 342 and alignment projection 344. When connection module 100 is fully assembled, spring pins 342 on the pusher case 300 are aligned with spring pin aperture 248 on the slider case 200 such that spring pins 342 may come in contact with contact pads 520 of portable electronic device 500 in the inserted position.

As mentioned, alignment projection 344 is also disposed on the pusher cap 340 on the same surface as the spring pins 342. In some embodiments, alignment projection 344 is disposed on an opposite side of pusher cap 340 than alignment projection 244 and aligns with alignment projection aperture 252. In some embodiments, the distance between spring pins 342 and alignment projection 344 is substantially the same as the length of one portion of attachment projection 242. With this construction, alignment projection 344 corresponds to an opposite end of portable electronic device 500 than alignment projection 244. Accordingly, when connection module 100 is attached to portable electronic device 500 in the inserted position, alignment projections 244 and 344 secure connection module 100 in place with respect to portable electronic device 500 (FIG. 3).

In some embodiments, pusher cap 340 provides foam pieces 348 on an inner surface. Foam pieces 348 may provide cushioning for the various pieces to accommodate tolerances in the features of each piece and provide for optimal fit of the assembled connection module 100.

Spring pins 342 may be connected to circuit board 360. Circuit board 360 provides circuitry for connection module 100. As mentioned above, circuit board 360, in some embodiments, includes memory and/or a controller, such that connection module 100 may be programmed to perform various operations on portable electronic device 500. In other embodiments, circuit board 360 merely provides a connection between connector 400 and spring pins 342. Thus, connection module 100 may merely pass-through communication from another device to portable electronic device 500.

According to some embodiments, circuit board 360 may include a protrusion 362 that mates with a slot 332 on an inner surface of pusher case 300. In some embodiments, circuit board 360 includes two protrusions 362, with one on each side. Similarly, pusher case 300 may provide two slots 332, with one on each side. Protrusions 362 function to place and fix circuit board 360 in an appropriate position within pusher case 300.

Circuit board 360 may include a connector port 364 that receives connector 400 to establish an electrical connection between connector 400 and circuit board 360. In some embodiments, connector port 364 is an Apple Lightning® port.

Figure 10:
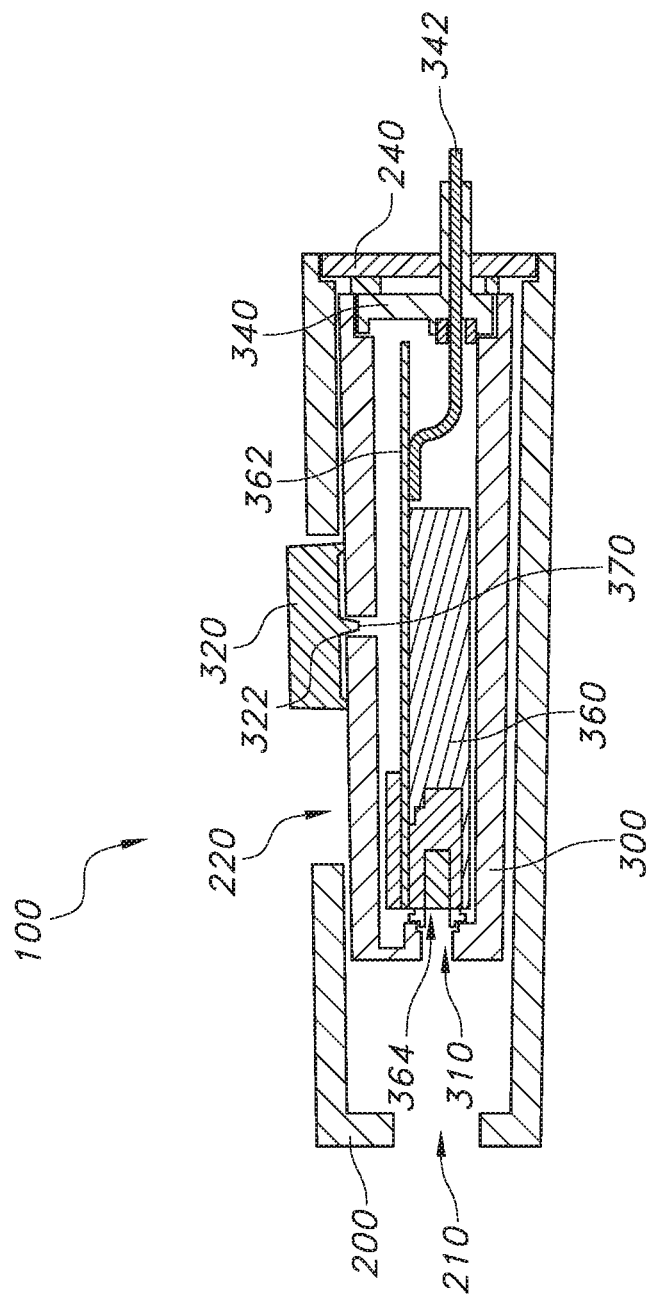
FIG. 10 is a side view of a connection module according to some embodiments.

Embodiments of the connection module 100 as described herein may be assembled according to the following description and the illustration in FIG. 10. Spring pins 342 may be glued to pusher cap 340 and to circuit board 360. These components may then be inserted into pusher case 300 with protrusion 362 in slots 332 in the slot guiding circuit board 360 into its proper position. Pusher case 300 may then be glued to pusher cap 340. This sub assembly may be inserted into slider case 200. Slider case 200 may then be glued to slider cap 240. Finally, button 320 may be glued to pusher case 300 through button aperture 220.

With this full assembly of connection module 100, connection module 100 is suitable for use with portable electronic device 500. When not in use, connection module 100 is set to its retracted position. According to some embodiments, on an inner side of the back surface of slider case 200 are disposed magnets 250 (FIG. 6). While FIG. 6 illustrates two magnets 250, other embodiments may only use one magnet 250. Alternatively, more than two magnets 250 could be utilized in yet other embodiments. Moreover, the placement of magnets 250 could be altered within the scope of the present invention. Pusher case 300 further comprises magnets 350 disposed on an interior rear surface of pusher case 300 (FIG. 8). Magnets 350 correspond to and attract magnets 250 with a magnetic force. The magnetic force between magnets 250 and magnets 350 help actuate and maintain the retracted position. Accordingly, button 320 and pusher case 300 may snap into place in the retracted position by virtue of this magnetic force. The magnetic force may further act to hold button 320 and pusher case 300 in the retracted position. This magnetic force, however, is not so great that it cannot be overcome by a force exerted by a user on button 320 in the opposite direction.

Accordingly, a user can push button 320 to transition from the retracted position to the inserted position. Similarly to magnets 250 and 350, in some embodiments magnets 246 may be provided on an inner surface of slider cap 240 (FIG. 6) with corresponding magnets 346 disposed on an inner surface of pusher cap 340 (FIG. 8). Thus, magnets 246 and magnets 346 attract each other with a magnetic force to bias button 320 and pusher case 300 to the inserted position.

Where magnetic attraction is described between pairs of magnets, some embodiments may alternatively replace one magnet of the pair with a ferromagnetic or ferrimagnetic material, such that magnetic attraction is still provided as described.

In operation, connection module 100 is initially attached to portable electronic device 500 in its retracted position. Attachment projection 242 slides into mating structure interface 510 on portable electronic device 500 until alignment projection 244 abuts an edge of portable electronic device 500. At this point, spring pins aperture 248 and spring pins 342 are aligned with contact pads 520 on portable electronic device 500. A user can then move button 320 to transition from the retracted position to the inserted position. Upon this transition, connection module 100 establishes an electrical connection with portable electronic device 500 as the spring pins 342 come into contact with contact pads 520. In addition, in the inserted position, alignment projection 344 abuts an opposite edge of portable electronic device 500. Thus, alignment projections 244 and 344, along with attachment projection 242, effectively lock connection module 100 into place as long as it maintains the inserted position (FIG. 3). Once all desired interactions are complete, the user can move button 320 to transition back to the retracted position and then slide attachment projection 242 out of mating structure interface 510.

This application relates generally to U.S. Application No. 62/057,658, filed on Sep. 30, 2014 the entirety of which is hereby incorporated by reference.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The detailed description section is intended to be used to interpret the claims. The summary and abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A connection module for a portable electronic device, the connection module comprising:
    a mating structure configured to attach to a mating structure interface of the portable electronic device, wherein the mating structure comprises:
        a fixed alignment projection disposed on a first end of the mating structure;
        a retractable alignment projection disposed on a second end of the mating structure; and
        a retractable electrical connector disposed between the fixed alignment projection and the retractable alignment projection, wherein the retractable electrical connector and the retractable alignment projection are fixed relative to each other and movable relative to the fixed alignment projection.

2. The connection module of claim 1, wherein the retractable electrical connector comprises spring pins.

3. The connection module of claim 1, wherein the fixed and retractable alignment projections are disposed on opposite ends of the portable electronic device when the connection module is attached to the portable electronic device, thereby preventing movement of the portable electronic device relative to the retractable electrical connector.

4. The connection module of claim 1, wherein the mating structure comprises a partially cylindrical structure disposed between the fixed alignment projection and the retractable alignment projection.

5. The connection module of claim 4, wherein when the connection module is attached to the portable electronic device:
    the partially cylindrical structure is disposed within a cylindrical groove of the portable electronic device to prevent movement of the portable electronic device relative to the connection module in at least two dimensions, and
    the first and second alignment projections are disposed on opposite ends of the cylindrical groove to prevent movement of the portable electronic device relative to the connection module in a third dimension different from the at least two dimensions.

6. The connection module of claim 1, wherein the mating structure comprises two partially cylindrical structures disposed between the fixed alignment projection and the retractable alignment projection and separated from each other by a gap.

7. The connection module of claim 6, wherein the retractable electrical connector extends through the gap between the two partially cylindrical structures when the retractable electrical connector is in an extended position.

8. The connection module of claim 1, wherein the connection module comprises an external housing, and wherein the mating structure is disposed on a front surface of the external housing.

9. The connection module of claim 8, wherein the front surface comprises at least two apertures through which the retractable alignment projection and the retractable electrical connector are configured to move.

10. The connection module of claim 8, further comprising an aperture disposed in the external housing; and
    a button slidable with respect to the external housing and accessible through the aperture.

11. The connection module of claim 10, wherein the button is configured to slide within the aperture to move the retractable alignment projection and the retractable electrical connector between a retracted position and an extended position.

12. The connection module of claim 8, further comprising:
    a first retraction magnet fixed relative to the external housing; and
    a second retraction magnet fixed relative to the retractable alignment projection and the retractable electrical connector,
    wherein the first and second retraction magnets are configured to hold the retractable alignment projection and the retractable electrical connector in a retracted position or an extended position.

13. A method of connecting a connection module to a portable electronic device, the method comprising:
    sliding a mating structure of connection module into a mating structure interface of the portable electronic device until a first alignment projection of the mating structure abuts the portable electronic device;
    electrically connecting an electrical connector of the connection module to contact pads of the portable electronic device by moving the electrical connector from a retracted position to an extended position; and
    locking the portable electronic device in position relative to the connection module by a second alignment projection that abuts the portable electronic device opposite the first alignment projection.

14. The method of claim 13, wherein the second alignment projection locks the portable electronic device in position by moving from the retracted position to the extended position after the mating structure of the connection module is slid into the mating structure interface of the portable electronic device.

15. The method of claim 13, further comprising:
    moving the electrical connector to the retracted position; and
    sliding the mating structure out of the mating structure interface.

16. The method of claim 13, wherein moving the electrical connector from the retracted position to the inserted position comprises sliding a button fixed relative to the electrical connector along a track disposed in an external housing of the connection module.

17. The method of claim 13, wherein moving the electrical connector from the retracted position to the inserted position moves spring pins of the electrical connector and the second alignment projection from within an external housing of the connection module to extend out of the external housing of the connection module.

18. The method of claim 13, wherein a direction of sliding the mating structure into the mating structure interface is perpendicular to a direction of a transition between the retracted position and the extended position.

19. The method of claim 13, further comprising obtaining diagnostic information from components of the portable electronic device through the electrical connector.

20. The method of claim 13, further comprising writing data to components of the portable electronic device through the electrical connector.

* * * * *